June 24, 1958 — J. L. STOKES ET AL — 2,840,127
APPARATUS FOR MAKING WOOD SHAVINGS
Filed May 20, 1955 — 2 Sheets-Sheet 1

INVENTORS
Joseph L. Stokes
George Attle
By Bailey, Stephens and Huettig
Attorneys

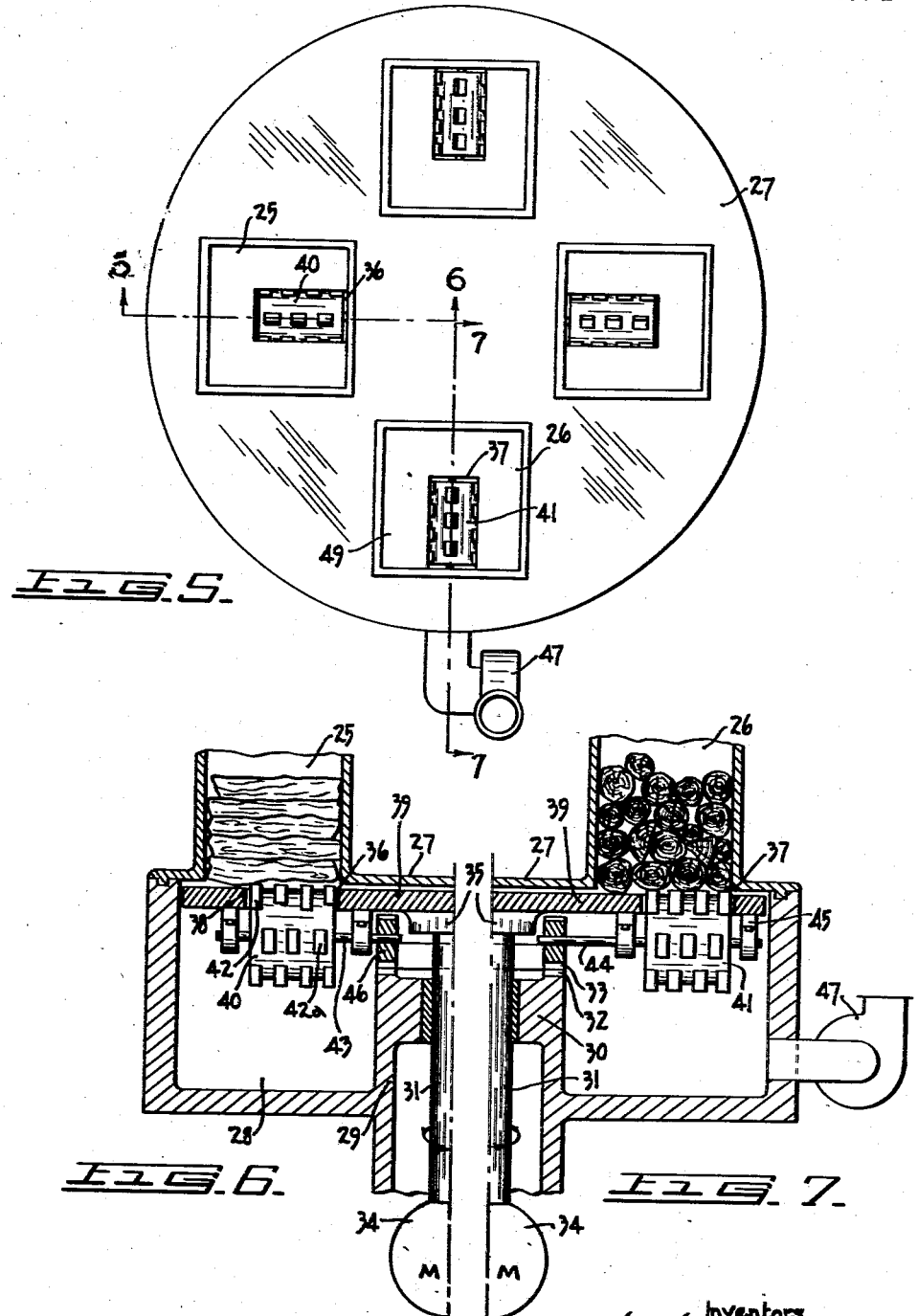

United States Patent Office 2,840,127
Patented June 24, 1958

2,840,127

APPARATUS FOR MAKING WOOD SHAVINGS

Joseph L. Stokes and George Attle, Sault Ste. Marie, Ontario, Canada, assignors to Abitibi Power & Paper Company, Limited, Iroquois Falls, Ontario, Canada, a corporation of the Dominion of Canada Application May 20, 1955, Serial No. 509,769

Claims priority, application Canada June 5, 1954

3 Claims. (Cl. 144—172)

This invention relates to a wood shaving apparatus and more particularly to an apparatus for providing shavings in the form of platelets both the side and end edges of which are feathered.

A synthetic board of excellent properties can be produced using platelets having feathered edges, as the interstitial voids which would otherwise occur will be substantially eliminated. The tapering of each of the edges of the platelets in a commercially satisfactory machine which will give a high output of uniform products with a minimum of fines presents the problem dealt with by this invention.

In accordance with this invention an apparatus is provided including a cutting head having a plurality of rows of forwardly inclined cutting knives with their cutting edges lying parallel to the axis of rotation of the cutting head. The knives of each row are staggered with respect to and slightly overlap the knives of the adjacent rows to provide feathering for two of the edges. The other two edges are feathered by reason of the arc of the cut.

Figure 5 is a plan view showing another embodiment of this invention.

Figure 6 is a sectional view on the line 6—6 of Figure 5 showing part of the embodiment of Figure 5.

Figure 7 is a sectional view similar to Figure 6 on the line 7—7 of Figure 5.

Figure 1:
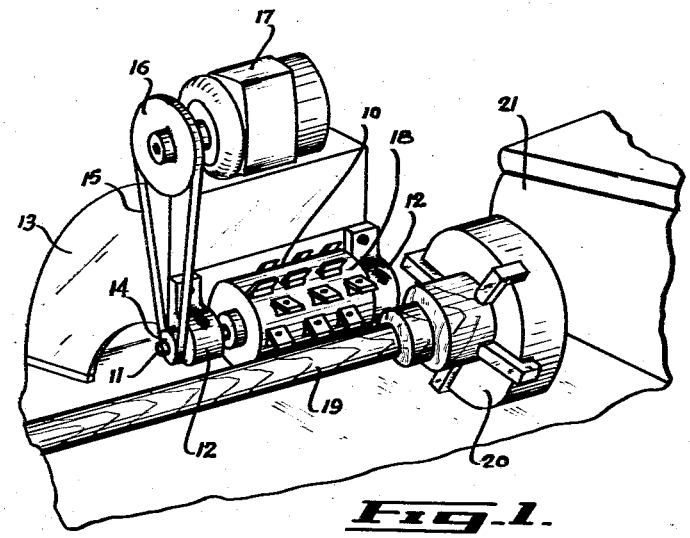
Figure 1 is a perspective view of one embodiment of this invention.
Figure 2:
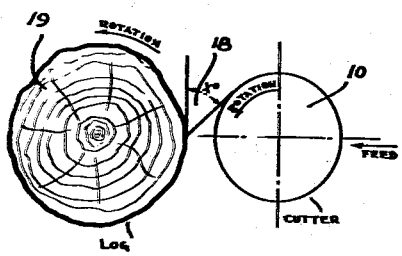
Figure 2 is a diagrammatic sectional view illustrating the operation of the construction shown in Figure 1.
Figure 3:
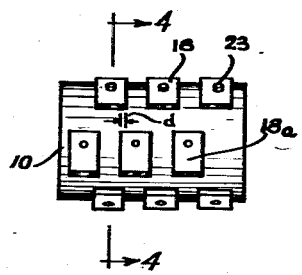
Figure 3 is a detail view of the cutter head in Figure 2.
Figure 4:
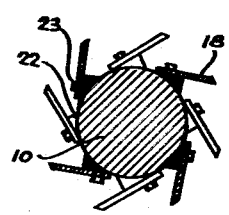
Figure 4 is a section on the line 4—4 of Figure 3.

In the embodiment illustrated in Figures 1 to 4 inclusive, a rotary cutter head 10 is mounted on shaft 11 which in turn is carried by bearings 12. Bearings 12 are secured to housing 13. A driving pulley 14 is driven by belt 15 from the pulley 16 of motor 17. Cutting knives 18 mounted on cutter head 10 are brought into position to cut platelets from a log 19 which is carried by chuck 20. The log is rotated in a clockwise direction by means of motor 21 when viewed in the direction of chuck 20. Cutter head 10 also is rotated in a clockwise direction so that the blades of the knives 18 will be moving in an opposite direction to that of the surface of the log being cut at the point of the cut. As is shown diagrammatically by Figure 2, the knives 18 of the cutter head are forwardly inclined in the direction of rotation so that the surfaces of the blades are at an angle $x°$ with a tangent to the surface of the log. This angle $x$ should be maintained as close to zero degrees as mechanical considerations will permit. The knives should be mounted on the cutter head in such a way that the inner face of the cutting blade is tangential to the circular path described by this cutting blade. The point of contact of this tangent, and a radius of the cutter head, ideally should be coincident with the cutting edge. To accomplish this a curved or offset knife may be required. The cutter head is shown in detail in Figures 3 and 4. The cutting head includes longitudinally extending ribs 22 to which the blades 18 are secured by bolts 23. The ribs mount the blades at the correct angle. The blades 18a in alternate rows are staggered with respect to blades 18 and overlap blades 18 a distance $d$. Considering knives 18 and 18a, Figure 3, the leading knife 18 removes a platelet from the log, knife 18a removes a platelet from an adjacent but different location on the log due to the rotation of the log and the cutter. When knife 18a moves in the required distance to give the desired caliper of a platelet cut from the log at a point adjacent to the location of the platelet removed by knife 18, the platelet cut by knife 18a has already had a strip along the edge of the platelet removed by knife 18 due to the overlapping of knives. The caliper along the ends of the platelets is about one third to one half the caliper of the platelet measured through the centre.

It was found that platelets of a satisfactory size for making a synthetic board were produced by providing a cutting head of eight inches diameter and carrying twenty-four knives arranged in eight rows of three, one inch wide knives, every other row being staggered. The knives were set so that angle $x$ was 45° and alternate rows of knives overlapped each other by 1/8 inch. The cutting head was driven at 3,000 R. P. M. and the log at 600 R. P. M. The caliper of the platelets can be controlled by adjustment of the rate of feed of the cutter. The apparatus described above has been tested with white pine, spruce, yellow birch, white birch, aspen poplar, western red cedar and jack pine. All of these species with the exception of western red cedar were successfully cut. Yellow birch gave the cleanest showings and the least fines. If the angle of the knives had been reduced below 45°, a further improvement in the quality of the shavings would have been obtained.

Another embodiment of this invention is shown in Figures 5 and 6. The embodiment shown in Figures 5 and 6 and 7 comprises two pairs of hoppers 25 and 26 respectively mounted on roof plate 27 which is apertured so that logs placed within the hoppers can descend through plate 27. Plate 27 is mounted on magazine 28 which receives the platelets which have been cut. A central pillar 29 has a horizontal web portion 30 which provides a journal for shaft 31 and supports a stationary ring gear 32 with upwardly directed teeth 33. Vertical shaft 31, which is driven by motor 34, is secured to disc 35. Disc 35 has an aperture 36 which extends radially from the inner edge of hopper 25 to a point beyond the mid point of the hopper. A similar aperture 37 extends from the outer wall of hopper 26 radially inwardly beyond the mid point of the hopper. The disc 35 thus has a shoulder portion 38 on the outer edge of aperture 36 and a shoulder portion 39 on the inner edge of aperture 37, and diametrically opposite apertures are equidistant from the central vertical axis of rotation so that the equipment will be balanced.

Rotary cutter heads 40 and 41 are disposed so that cutting blades 42 mounted on cutter heads 40 and 41 pass a short distance through the apertures while the cutter heads are being rotated. Alternate rows of blades 42a on the cutter heads are staggered with respect to blades 42 with an overlap between the staggered blades. The cutter blades are forwardly inclined in the direction of rotation, and have cutting edges close to the surface of their cutter head. The cutter heads 40 and 41 are mounted on shafts 43 and 44 respectively. Shafts 43 and 44 are journalled by supporting brackets 45 which are secured to the lower surface of disc 35. Pinions 46 are mounted on shafts 43 and 44 and engage gear 32. When shaft 31 is rotated, the pinions 46 cause cutter heads 40 and 41 also to be rotated with the consequence that the cutter heads will be rotated and at the same time there will be relative movement between the logs in the hoppers and the blades in a direction opposite to the direction of movement of the cutter blades acting on the logs. The platelets produced can be removed by exhaust fan or blower 47. The logs can be arranged as shown in hopper 25 so that their longitudinal axes are radial with respect to disc 27 to provide horizontal cuts. In this case shoulders 38 and 39 will control the rate of descent of the logs, and the cutting heads in successive quadrants will act alternately on one end and then on the other end of the logs being cut. The logs can also be arranged to make vertical cuts as shown in hopper 26 in which case the descent of the logs will be controlled by the portions 48 and 49 of disc 27 on each side of aperture 36 or 37. Each of the apertures 36 and 37 is narrower than hoppers 25 and 26 in a direction radially of disc 35 to define shoulder portions 38 and 39 respectively of the disc to support the wood being cut and thereby maintain the wood in spaced relationship with respect to the cutter heads 40 and 41. One of the apertures, namely aperture 37, extends to the outside of the hoppers 25 and 26 and the other of the apertures, namely aperture 36, extends to the inside of hoppers 25 and 26. Thus apertures 36 and 37 and the knives or cutter blades 42 and 42a passing through apertures 36 and 37 combine to cover the full width of hoppers 25 and 26 in a direction radially of the disc 39. Wood in other forms, such as slab wood, can also be placed in the hoppers, but the use of logs is preferred, as these can be oriented more readily for cutting either with or across the grain.

It will be appreciated from the foregoing that an apparatus in accordance with this invention is well adapted to the production of platelets of the type contemplated.

What we claim is:

1. A wood shaving apparatus comprising a disc, means for rotating said disc about a vertical axis, at least two rotary cutter heads, means for rotating said cutter heads about axes perpendicular to and intersecting the axis of rotation of the disc, a plurality of rows of forwardly inclined cutting knives with their cutting edges lying parallel to the axis of rotation of each cutter head, said cutter heads being positioned so that the rows of cutting knives project successively through an aperture in said disc during the rotation of said cutter head, feeding hoppers for supplying wood to a position on said disc in which said cutting knives will cut platelets from the wood, shoulder portions on said disc, each of said apertures being narrower than the hoppers in a direction radially of the disc to define said shoulder portions of the disc to support the wood being cut and thereby to maintain the wood in spaced relationship with respect to the cutter heads but in contact with said cutting knives, one of said apertures extending to the outside of said hoppers and the other of said apertures extending to the inside of said hoppers, the knives passing through said apertures combining to cover the full width of said hoppers in a direction radially of the disc.

2. A wood shaving apparatus as in claim 1 in which the knives of each row are staggered with respect to the knives of adjacent rows so that the knives of each row cover spaces between the knives of adjacent rows and extend laterally to overlap said knives of adjacent rows to provide platelets having feathered side and end edges.

3. A wood shaving apparatus as in claim 1 in which there are two pairs of rotary cutter heads, the cutter heads of each pair being disposed diametrically opposite to each other and equidistant from said vertical axis.

References Cited in the file of this patent

UNITED STATES PATENTS

| | | |
|---|---|---|
| 233,472 | Burrell | Oct. 19, 1880 |
| 233,765 | Innis | Oct. 26, 1880 |
| 1,705,251 | Hollis | Mar. 12, 1929 |
| 2,549,251 | Skelton | Apr. 17, 1951 |
| 2,655,189 | Clark | Oct. 13, 1953 |
| 2,675,182 | Wasalaski | Apr. 13, 1954 |
| 2,727,542 | Fischer | Dec. 20, 1955 |
| 2,739,627 | Vohringer | Mar. 27, 1956 |
| 2,751,947 | Wyss | June 26, 1956 |

FOREIGN PATENTS

| | | |
|---|---|---|
| 658,524 | Great Britain | Oct. 10, 1951 |